Feb. 4, 1947.  W. H. STANGLE  2,415,223
RADIANT PROVIDED WITH TRIANGULAR PYRAMIDAL PROJECTION
Filed June 12, 1943
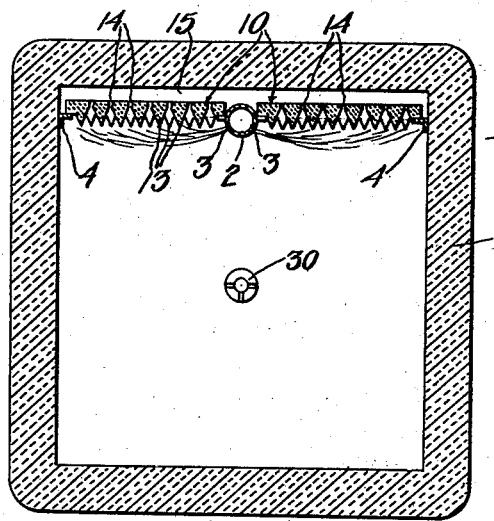
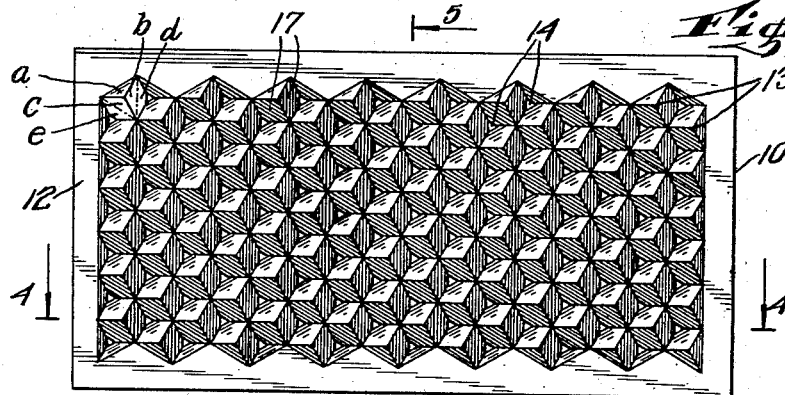
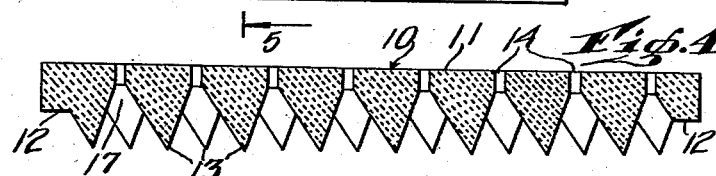
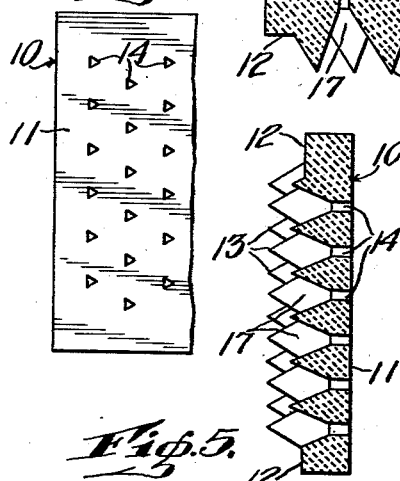
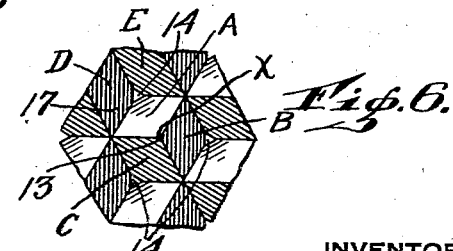
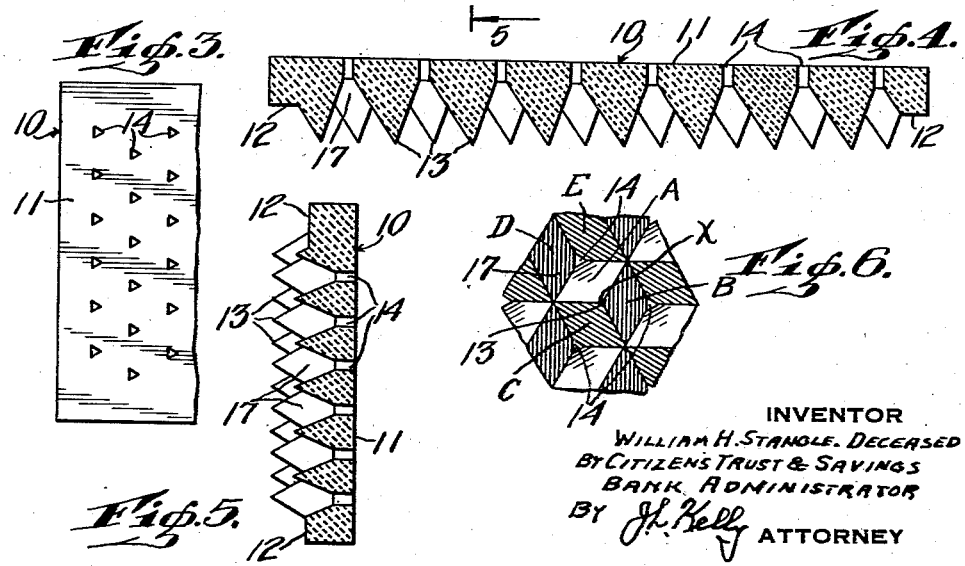
INVENTOR
WILLIAM H. STANGLE, DECEASED
BY CITIZENS TRUST & SAVINGS
BANK, ADMINISTRATOR
BY J. L. Kelly
ATTORNEY Patented Feb. 4, 1947

2,415,223

UNITED STATES PATENT OFFICE 2,415,223

RADIANT PROVIDED WITH TRIANGULAR PYRAMIDAL PROJECTION

William H. Stangle, deceased, late of Evansville, Ind., by Citizens Trust & Savings Bank, administrator, Evansville, Ind., assignor to Servel, Inc., New York, N. Y., a corporation of Delaware Application June 12, 1943, Serial No. 490,671

8 Claims. (Cl. 126—92)

This invention relates to radiant heaters and, more particularly, to a radiant heater for use with food broilers.

It is generally accepted that the best broiling or barbecuing is accomplished by radiant heat. Heretofore, solid fuels, such as, coal, coke, charcoal and wood have given the best results where radiant heat is desired because of the ability of a glowing bed of these solid fuels to produce highly radiant heat emissions.

However, these solid fuels are not particularly desirable or convenient for certain uses, particularly domestic use. Gaseous fuel, on the other hand, is convenient and desirable for domestic use, but does not, when used in the conventional gas burner, produce the highly intense radiant heat necessary for broiling or barbecuing—it being an accepted fact that broiling particularly should be fast or with speed.

It, therefore, follows that, since a glowing bed of the above mentioned solid fuels produces radiant heat of high intensity, but the fuel itself is not convenient for certain uses, and gaseous fuel, which is flexible and convenient for most uses but does not, when used in the ordinary burner, produce radiant heat of high intensity, then the ideal arrangement is to provide a radiant heater that simulates a bed of glowing coals and which is heated by a gas flame.

It is, therefore, an object of this invention to provide a gas heated radiant the radiating surface of which simulates the surface of glowing coals.

Another object of this invention is to provide a gas heated radiant with provisions therein which produce a chimney effect to carry off the products of combustion of the gas burner.

A still further object of this invention is to provide a gas heated radiant with provisions therein whereby the gaseous by-products of cooking will be substantially consumed within said radiant.

It has been found that a radiant that meets the above requirements, that is, one which closely simulates a glowing fuel bed, which quickly converts the heat of a blue gas flame to uniform radiant heat of high intensity and which produces the desired chimney action, is provided by constructing said radiant of a slab of ceramic or other heat resisting material with the radiating surface thereof substantially covered with angular projections and depressions and with the depressions converging into openings or chimneys which pass through the radiant.

In a companion application Serial No. 490,670 of William H. Stangle, deceased, of even date there is disclosed and claimed two different heat radiants: one wherein the radiating surface is formed of square pyramidal projections; and the other wherein the radiating surface is formed of octagonal pyramidal projections. Each of these radiants appear to be novel and to possess certain advantages over known prior art radiants. With square pyramids covering the entire radiating surface the actual radiating area is greater than with octagonal pyramids even though the octagonal pyramidals supply a greater number of radiating faces. But with the octagonal pyramids, because some of the faces slope directly into the openings, the chimney action is better than with the square pyramids.

With these premises established, it appears that the greatest possible radiating area per unit of horizontal area is provided by covering the radiating surface with equilateral triangular pyramids, and that the best chimney action is provided by forming triangular pyramidal depressions between the triangular pyramidal projections with the apices of said pyramidal depressions opening directly in the chimneys.

Therefore, according to a preferred embodiment of this invention, there is disposed a plurality of ceramic radiants on each side of a gas burner formed with laterally directed flame ports and located in the upper portion of a broiling chamber. Specifically each of these radiants is provided on its radiating surface with projections in the form of equilateral triangular pyramids. Additional surfaces are provided by extending the faces of the pyramids below their base lines in the same respective plane as the faces of the pyramids. These additional surfaces converge in points which are the same distance from the bases of the respective pyramids as the apices of the respective pyramids are from said bases. From the points of convergence of these surfaces openings are provided which extend through the radiant. The result is that between any three pyramids wherein one base line of each forms a side of a triangle there is formed a pyramidal depression which extends in the opposite direction from the pyramids. This arrangement not only doubles the effecting radiating surfaces of the projections per unit of horizontal area but, tends also to greatly increase the chimney effect of said openings.

Referring now to the drawing which illustrates a preferred embodiment of this invention and wherein like numerals refer to like parts throughout the several figures, of which:

Fig. 1 is a vertical sectional view of a broiling chamber with the improved radiant heater incorporated therein;

Fig. 2 is a bottom plan view of a radiant constructed in accordance with this invention;

Fig. 3 is a fragmentary top plan view of the radiant illustrated in Fig. 2;

Fig. 4 is a longitudinal vertical sectional view on line 4—4 of Fig. 2;

Fig. 5 is a transverse vertical sectional view on line 5—5 of Fig. 2; and

Fig. 6 is a partial bottom plan view similar to Fig. 2, but showing a portion of the radiant enlarged.

In Fig. 1 there is shown a broiling chamber 1 having a gas burner 2 located in the upper portion thereof and extending from the front to the rear of said chamber. This gas burner 2 is provided on its two horizontal sides with spaced gas ports 3 which extend throughout the length of said burner and which are adapted to project gas flames laterally from the center toward each side of said broiling chamber. A plurality of heat radiants 10, to be described more in detail hereinafter, are located on each side of the gas burner 2 and extend from the burner to the side walls of the broiling chamber. These radiants 10 are supported at their outer ends by angular members 4 which are attached to the sides of the chamber, and at their inner ends they are supported by the gas burner. Or the radiants may be supported by a framework (not shown) which in turn is supported in any suitable manner by the side walls of the broiling chamber. A space 15 is provided between the top of the radiants 10 and the ceiling of the broiling chamber. The arrangement being such that blue gas flames issuing from the gas burner ports 3 pass under and between projections 13 on the radiants to thereby heat said projections to incandescence and convert the heat of the blue gas flames into radiant heat. The products of combustion of said gas flames pass upwardly through openings or chimneys 14 in the radiants, through the space 15 and out an opening (not shown) which extends across the back of the broiling chamber in line with the space 15.

In Figs. 2–6 there is shown one of the radiants 10 referred to above. This radiant consists of a slab of ceramic material with a flat top portion 11 and with the lower portion thereof covered, except for a slight margin 12, with equilateral triangular pyramidal projections 13 and triangular pyramidal depressions or cavities 17. The faces of the triangular depressions 17 are formed by extending the faces of the triangular projections 13 into the body of the radiant. This construction may be more clearly explained by stating that if a plane be passed across the marginal face 12 horizontally from one side of the radiant to the other side thereof each time said plane cuts through a base line of one of the triangular faces of a triangular pyramidal projection it will at the same time cut through an imaginary base line of one of the triangular faces that form the triangular pyramidal depressions. This may be illustrated in Fig. 2 of the drawing by passing a plane horizontally through the upper left corner of the radiant 10 along the marginal face 12. This plane will cut through the base lines of the triangular projecting faces *a*, *b* and *c* and at the same time this plane will cut through the base lines of the triangular depressed faces *d* and *e*. At the apex of each of the triangular pyramidal depressions 17 there is provided an opening or chimney 14 which extends upwardly through the body of the radiant.

With this arrangement substantially the entire lower or active surface of the radiant 10 is made up of what in reality amounts to sloping parallelogrammatic faces. In other words, the base lines of the triangular projecting faces are also the base lines of the triangular faces that form the depressions and each two triangular faces having a common base line form a parallelogram. These parallelogrammatic faces are so arranged that each parallelogrammatic face has in common therewith two similar parallelogrammatic faces and these three faces meet in a point to form a downward projection. Also each parallelogrammatic face has two other similar parallelogrammatic faces in common therewith and these three faces converge into an opening or chimney 14 and form an inverted funnel. This is illustrated in Fig. 6 of the drawing wherein parallelogrammatic faces A, B and C meet in a point X and parallelogrammatic faces A, D and E converge into an opening 14.

The extended faces of the projections act as secondary heat exchangers to first strip the products of combustion of the gas flames of any heat that remains after the flames have passed over the projections and then these faces heat the by-products of broiling to substantially consume them. This results not only in a very efficient use of fuel gas in that the radiating surfaces are rapidly heated to incandescence and the radiant heat is rapidly transferred to the food to be broiled, but also by this arrangement the disagreeable fumes and other gaseous by-products of broiling are eliminated.

In operation, food to be broiled is placed in a broiling grill and the grill is supported in a rotatable chuck 30 (not a part of this invention but described and claimed in copending application Serial No. 487,733, filed May 20, 1943, and which matured into Patent No. 2,387,621 on October 23, 1945) beneath the radiant heater. The gas burner is lighted and the blue gas flames from said burner pass under and between the triangular pyramidal projections on the radiants and heats said projections to incandescence thereby converting the heat of said flames to radiant heat of high intensity, whereby said projections simulate a glowing bed of solid fuel. The intense radiant heat from the glowing projections is then transmitted directly to the food. Due to the intense radiant heat the food is quickly broiled and fumes and other gaseous by-products of broiling pass upwardly through the broiling chamber with secondary air and join the products of combustion of the gas burner and pass with them through the funnel-like depressions in the radiants, through the chimneys, through the space between the top of the radiants and the top of the broiling chamber and out the opening at the back of the chamber to the atmosphere. In passing through the zone of intense radiant heat in the vicinity of the chimneys, the fumes and other gaseous by-products of broiling are substantially consumed and the residuary gases that pass to the atmosphere are substantially free of obnoxious odors and greasy vapors.

This invention has been illustrated and described in connection with a broiling chamber for broiling or barbecuing foods. However, the invention obviously is not limited to this particular use since other uses will be apparent to those skilled in the art to which this invention pertains.

Also this invention is not limited to the precise construction of the radiants or the relative location of the radiants and the gas burner as many changes may be made in these details without departing from the main principles of the invention.

Having thus described the invention, what is claimed as new is:

1. As an article of manufacture, a heat radiant the radiating surface of which is made up of a series of pyramidal projections and a series of pyramidal depressions, each of the faces of the pyramidal depressions being a continuation of and in a common plane with one of the faces of the pyramidal projections, whereby said depressions and projections traverse substantially the entire radiating surface of the radiant, and said radiant having a series of openings therein which extend from the apices of said pyramidal depressions through said radiant.

2. As an article of manufacture, a heat radiant the radiating surface of which is formed of a series of inverted pyramidal projections, the faces of which are triangular in shape, and a series of pyramidal depressions the surfaces of which are triangular in shape, each of said depressions converging into an opening which extends through said radiant, the arrangement being such that each of the triangular faces of said projections adjoins and is a continuation of one of the surfaces of said depressions.

3. As an article of manufacture, a heat radiant the radiating surface of which is made up of a series of projections and a like series of depressions, said radiant being provided with a series of openings which extend therethrough and open into said depressions, the surfaces which form the depressions being continuations of the surfaces which form the projections with the surfaces of the depressions converging in said openings.

4. As an article of manufacture, a heat radiant for use in a gas fired food broiler the radiating surface of which radiant is formed of a series of inverted triangular pyramidal projections which are heated directly by gas flames and a series of triangular pyramidal depressions surrounding said projections and heated by products of combustion from said gas flames, and a series of chimneys extending from said depressions through said radiant, the arrangement being such that the surfaces of said depressions, which are continuations of the surfaces of said projections and converge into said chimneys, act as secondary heat exchangers to first strip the products of combustion of said gas flames of their heat and then to heat gaseous by-products of broiling which pass therethrough to substantially consume said by-products.

5. As an article of manufacture, a heat radiant the radiating surface of which is made up substantially entirely of a series of pyramidal projections and a series of pyramidal depressions independent of the pyramidal projections, the bases of the pyramidal depressions being in a common plane with the bases of the pyramidal projections, the surfaces which form the depressions being continuations of and in substantially the same plane as the surfaces which form the projections, and the apices of the pyramidal depressions and of the pyramidal projections being on the opposite sides of said common plane.

6. As an article of manufacture, a heat radiant the radiating surface of which is made up of a series of projections, each of which is formed of three sloping faces, and a series of depressions, each of which is formed with three sloping surfaces each of which surfaces is an extension of one of said plurality of faces, the construction and arrangement being such that each of the faces unites with one of the surfaces to form a radiating surface substantially in the form of a parallelogram, one corner of which parallelogram points downward and the diagonally opposite corner of which parallelogram points upward.

7. As an article of manufacture, a heat radiant comprising a body having opposed sides one side of which forms a radiating surface, said radiating surface being made up substantially entirely of a series of triangular pyramids projecting from said one side of the body and a series of independent pyramidal depressions formed in said side and extending to an apex, the surfaces which form said depressions being continuations of and in substantially the same plane as the surfaces which form said projections.

8. As an article of manufacture, a heat radiant having opposed sides one side of which forms a radiating surface made up substantially entirely of a series of triangular pyramidal projections projecting in one direction from said one side and a like series of independent inverted triangular pyramidal depressions projecting in an opposite direction from said one side, each of the faces which form said triangular pyramidal projections being a continuation of and in a common plane with one of the surfaces which form said inverted triangular pyramidal depressions.

CITIZENS TRUST & SAVINGS BANK,
*Administrator of the Estate of William H. Stangle, deceased.*
By ADOLPH C. FROELICH,
*Vice-Pres.*

REFERENCES CITED

The following references are of record in the file of this patent:

UNITED STATES PATENTS

| Number | Name | Date |
|---|---|---|
| 2,182,734 | O'Dowd | Dec. 5, 1939 |
| 2,235,886 | Kahn | Mar. 25, 1941 |
| 2,244,045 | Bobo | June 3, 1941 |
| 2,255,349 | Christmas | Sept. 9, 1941 |
| 1,901,086 | Cox | Mar. 14, 1933 |
| 1,199,133 | Walsh | Sept. 26, 1916 |
| 1,073,660 | Brock | Sept. 23, 1913 |
| 1,963,817 | Wiederhold | June 19, 1934 |
| 2,263,432 | Wood, et al. | Nov. 18, 1941 |

FOREIGN PATENTS

| Number | Country | Date |
|---|---|---|
| 186,502 | Swiss | Jan. 2, 1937 |
| 377,183 | British | July 15, 1932 |